(12) United States Patent
Ikeno

(10) Patent No.: US 8,326,161 B2
(45) Date of Patent: Dec. 4, 2012

(54) IMAGE FORMING APPARATUS FOR PROCESSING A JOB WHEN EXITING A SERVICE MODE

(75) Inventor: Hideo Ikeno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 12/699,664

(22) Filed: Feb. 3, 2010

(65) Prior Publication Data

US 2010/0202786 A1    Aug. 12, 2010

(30) Foreign Application Priority Data

Feb. 6, 2009    (JP) ................................. 2009-025815

(51) Int. Cl.
*G03G 15/00*    (2006.01)
(52) U.S. Cl. ........................................................ 399/11
(58) Field of Classification Search ................ 399/8, 11, 399/80, 81, 85; 358/1.13
See application file for complete search history.

(56) References Cited

U.S. PATENT DOCUMENTS

| | | | |
|---|---|---|---|
| 5,893,005 A * | 4/1999 | Ogura | 399/11 |
| 6,327,446 B1 * | 12/2001 | Suzuki | 399/75 |
| 6,577,822 B2 * | 6/2003 | Inui et al. | 399/11 |
| 7,856,089 B2 * | 12/2010 | Hanna | 379/90.01 |
| 7,949,263 B2 * | 5/2011 | Nakamura | 399/9 |
| 2007/0180159 A1 | 8/2007 | Takahashi | |

FOREIGN PATENT DOCUMENTS

JP    2007-208528 A    8/2007

* cited by examiner

*Primary Examiner* — Robert Beatty
(74) *Attorney, Agent, or Firm* — Canon USA Inc. IP Division

(57) ABSTRACT

An image forming apparatus, when exiting the service mode, in response to receiving an operation to exit a service mode before a work related to maintenance ends, performs processing of a job if authentication based on generated authentication information is successful. Further, the image forming apparatus shifts to a normal mode when receiving the operation to exit the service mode after the work related to maintenance ends.

6 Claims, 10 Drawing Sheets

FIG. 3
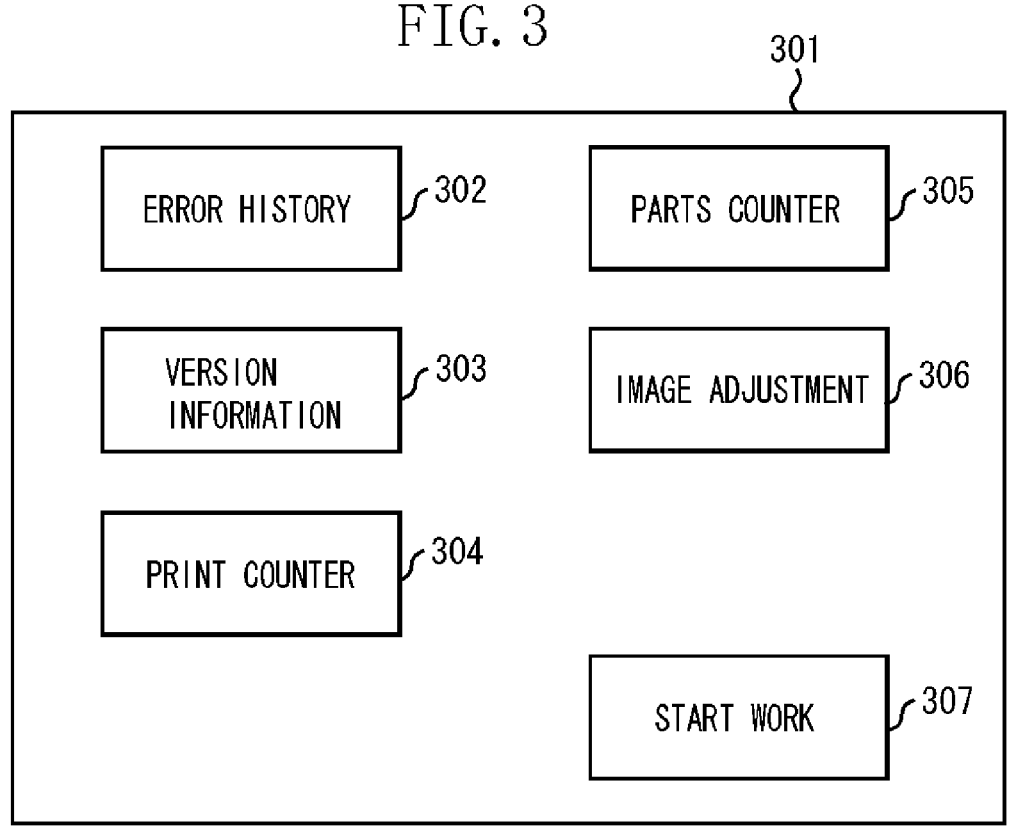
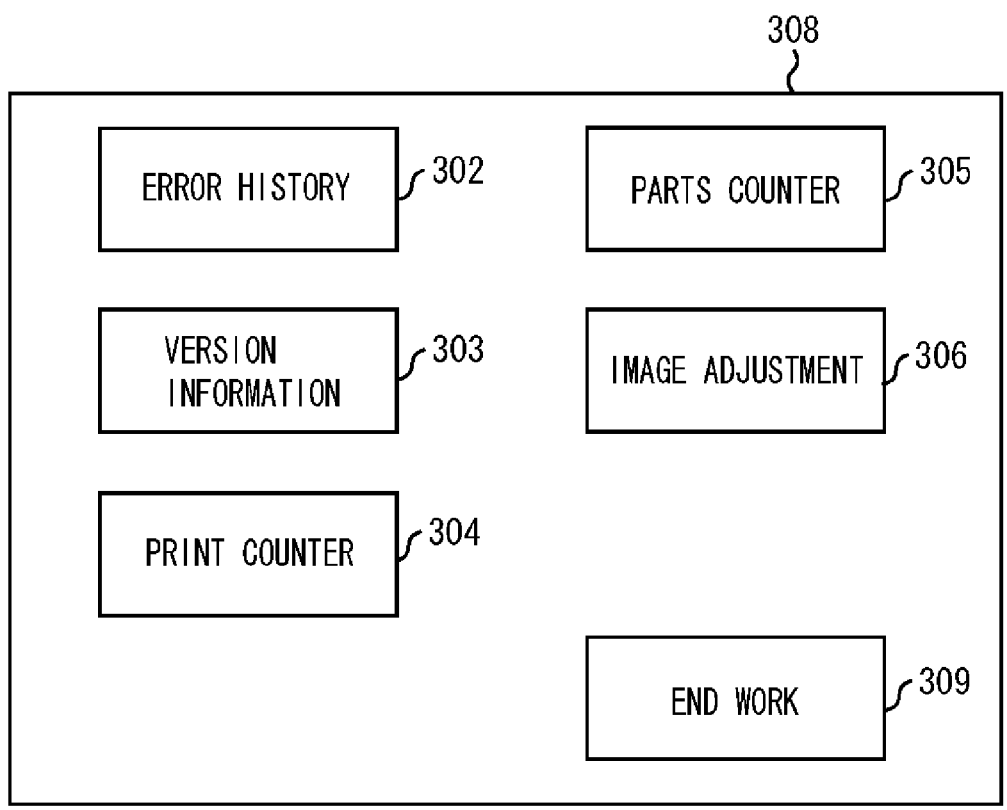

FIG. 5

| INFORMATION | | EXECUTION AUTHORITY | | |
|---|---|---|---|---|
| ACCOUNT | PASSWORD | MONOCHROME PRINT | COLOR PRINT | COPYING |
| User1 | xxxx | YES | YES | YES |
| ... | ... | ... | ... | ... |

501 — INFORMATION
502 — ACCOUNT row
503 — PASSWORD
504 — EXECUTION AUTHORITY

IMAGE FORMING APPARATUS FOR PROCESSING A JOB WHEN EXITING A SERVICE MODE

BACKGROUND OF THE INVENTION

1. Field of the Invention

The present invention relates to an image forming apparatus configured to be switchable between operation modes including a normal mode for performing processing such as receiving a job from a general user and a service mode for receiving a work by a service engineer.

2. Description of the Related Art

To perform maintenance and repair of the image forming apparatus, it has been the general practice to cause the image forming apparatus to shift to an operations mode referred to as a service mode, and to provide a special menu for the maintenance and repair, which is different from a menu for a normal printing operation. The image forming apparatus, herein used, refers to, for example, a printer, a copying machine, or a multifunction peripheral. When the maintenance or repair of such an image forming apparatus is performed, a service engineer enters the service mode by operating an operation panel or the like, which is provided in the image forming apparatus, and performs two typical types of works.

One type is a work to view and confirm information such as a version of a control program and a print counter. Another type is a work to reset a parts lifetime counter after having performed a parts replacement, or change setting values, which have the effect on an operation of the image forming apparatus, such as a parameter adjustment for adjusting an image quality or the like. In particular, when the latter work to change the setting values has been performed, it is checked whether the setting is appropriate by printing in advance test patterns executable from within the service mode.

However, in the image forming apparatus provided with multiple functions, even when the image forming apparatus enters the service mode via an operation panel and is in a dedicated menu state to maintenance/repair, a printing job can be received whenever necessary via a network. If a printing operation for a general user may be executed during the service mode. In such a case, the printing operation will be executed in an unstable state before confirming whether a setting change in the service mode is appropriate. Accordingly, the printing of which result cannot be guaranteed may be executed. Further, there may occur even such an event that a test printing work by the service engineer is delayed.

Japanese Patent Application Laid-Open No. 2007-208528 discusses a method for sequentially executing received jobs even during the service mode, a method for accumulating received jobs in a memory during the service mode, and a method for stopping receipt of jobs during the service mode. Then, the service engineer is allowed to select any one from these methods.

As described above, it is possible for the service engineer to select a method for storing jobs in a memory while the image forming apparatus is in the service mode, or a method for stopping receipt of jobs during the service mode. As a result, the image forming apparatus can be prevented from printing in an unstable state, and from a delay of a test pattern printing work by the service engineer. Any one of these methods is a method for dealing with the service mode.

However, with such a method, the image forming apparatus cannot execute such a job that a complicated setting or the like by a dedicated application is to be performed during the service mode. More specifically, the image forming apparatus cannot confirm the effect of a work regarding a complicated finishing setting and a recovery and confirmation on special-trouble occurrence data.

For this reason, for example, when confirming the effect of maintenance regarding a special setting, as described above, it is necessary to exit the service mode and to perform a normal printing operation from an operation unit of the image forming apparatus or from a personal computer (PC). Upon exiting the service mode in this way, the image forming apparatus can always receive a printing job via the network, and thus such control that jobs are stored in a memory during the service mode and receipt of jobs is stopped during the service mode, as in the conventional example, makes no sense.

Further, since jobs that are stored in the memory become executable at whatever time, it is assumed that, as soon as the image forming apparatus exits the service mode, printing operations of many jobs sent by the general users may be executed before the service engineer performs a test printing. Then, a testing work by the service engineer may be delayed. As a matter of course, the printing operation is performed in a state where the service engineer is making adjustments. As a result, regarding the processing when exiting the service mode, a printing result cannot be guaranteed.

SUMMARY OF THE INVENTION

The present invention is directed to a method for enabling preferentially executing a job by a service engineer even when a service mode is exited while a series of maintenance works is being performed by the service engineer.

According to an aspect of the present invention, an image forming apparatus operable in a service mode for performing a work related to maintenance and a normal mode for processing an input job includes a receiving unit configured to receive an operation to shift to the service mode and an operation to exit the service mode, an input unit configured to input an instruction for the work related to maintenance in the shifted service mode in response to the receiving unit receiving the operation to shift to the service mode, and a generation unit configured to generate authentication information to be used for confirmation processing of the work related to maintenance. When the image forming apparatus exits the service mode in response to the receiving unit receiving the operation to exit the service mode before the work related maintenance ends, processing of the job is performed if authentication based on the authentication information generated by the generation unit is successful. When the receiving unit receives the operation to exit the service mode after the work related to maintenance ends, the image forming apparatus shifts to the normal mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates a user interface to be displayed on a display unit.

FIG. 5 illustrates an example of authentication information retained by the multifunction peripheral.

DESCRIPTION OF THE EMBODIMENTS

Various exemplary embodiments, features, and aspects of the invention will be described in detail below with reference to the drawings.

Figure 1:
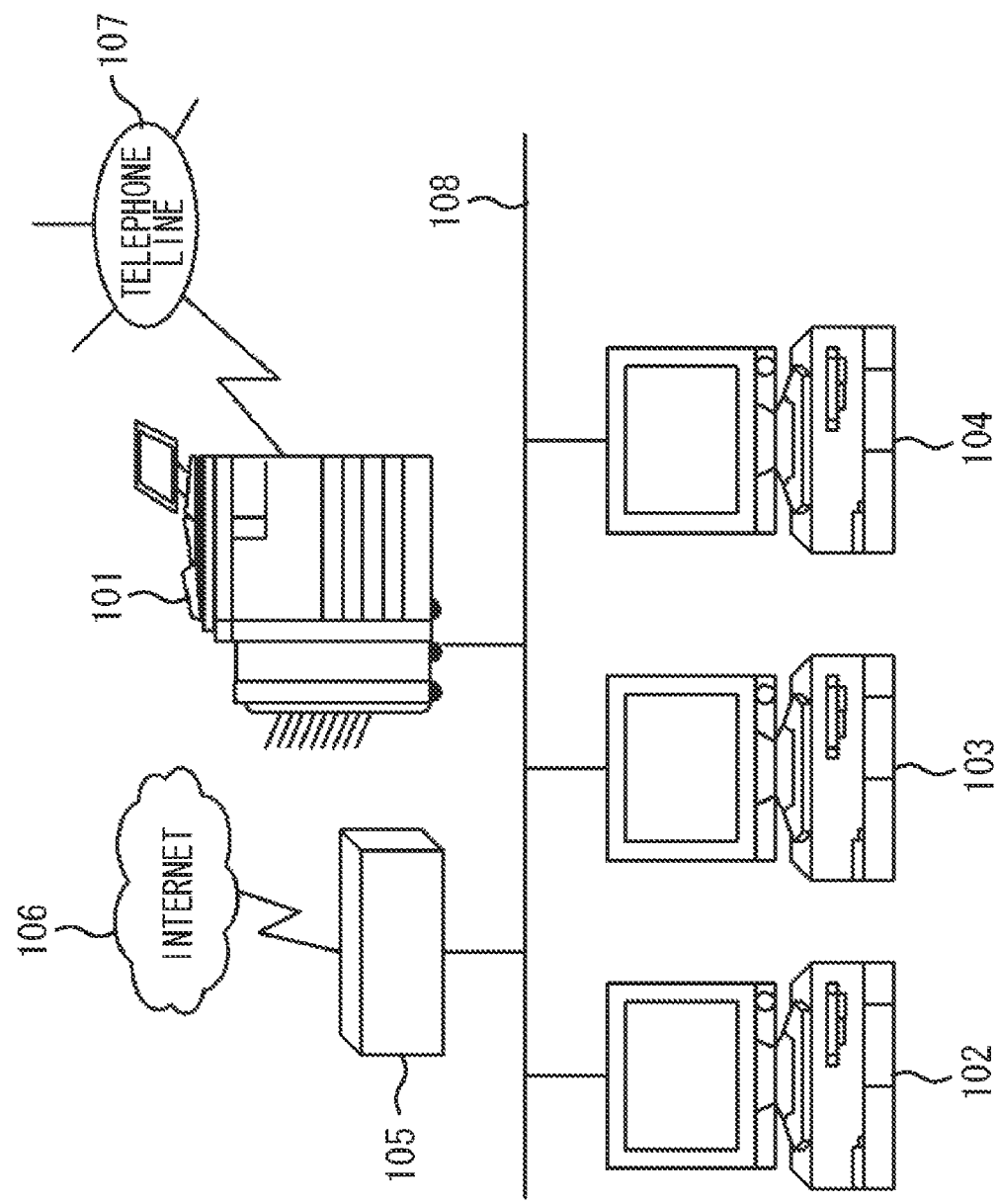
FIG. 1 illustrates an example of an image forming system.

FIG. 1 illustrates an example of an image forming system including an image forming apparatus according to an exemplary embodiment of the present invention. In the exemplary embodiment, an example of a multifunction peripheral (hereinafter, abbreviated as an MFP) is illustrated as an example of the image forming apparatus. The image forming apparatus according to the present exemplary embodiment is configured to be operable in a service mode for performing a work related to maintenance and a normal mode for processing an input job.

In FIG. 1, an MFP 101 processes copying, printing and scanner functions and a facsimile function in an integrated manner. Personal computers (PCs) 102 to 104 obtain output products (print products) from the MFP 101 by sending print data to the MFP 101 via an installed printer driver.

The MFP 101, the PCs 102, 103, and 104, and a router 105 are connected to a network 108, and they are connected to the Internet 106 via the router 105. Furthermore, the MFP 101 is connected to a telephone line 107 or the like to send and receive facsimile (FAX) data. In the system environment, the MFP 101 receives print data in different timings from the PCs 102, 103, and 104, the Internet 106, and the telephone line 107, and performs print processing.

In the present exemplary embodiment, while the MFP 101 is illustrated as the image forming apparatus, a copying machine having only a copying function, or a printer having only a printing function, or a facsimile having only a FAX function may be used as the image forming apparatus. Further, the image forming apparatus may be devices having some of the above-described functions in combination.

Figure 2:
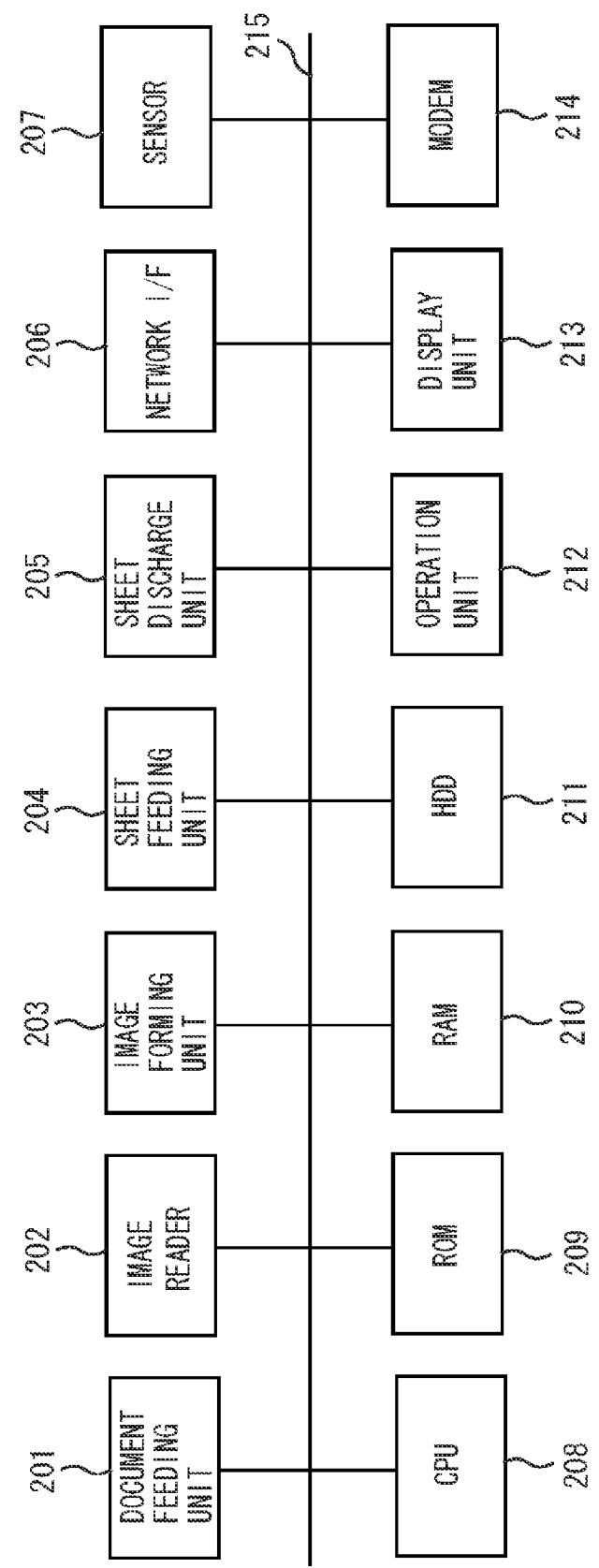
FIG. 2 is a block diagram illustrating a configuration of a multifunction peripheral.

FIG. 2 is a block diagram illustrating a configuration of the MFP 101 illustrated in FIG. 1. In FIG. 2, a document feeding unit 201 sends automatically a document to be read to an image reader 202. The image reader 202 includes an image sensor for reading a document fed from the document feeding unit 201, a document positioning plate, an optical scanning unit, and a controller unit. An image forming unit 203 prints image data of the read document or image data generated from received print data. A sheet feeding unit 204 feeds sheets for print. A sheet discharge unit 205 discharges printed sheets and subjects them to processes such as sorting and stapling. A network interface (I/F) 206 is connected to a local area network (LAN) and the Internet via a network to perform information exchange with external devices. A sensor 207 detects a state of each part of the apparatus.

A central processing unit (CPU) 208 controls each processing to be performed on the apparatus. A read-only memory (ROM) 209 stores programs and data involved in each processing by the apparatus. A random-access memory (RAM) 210 can electrically store temporary data involved in each processing by the apparatus and rewritably stores the data. An external storage device (hard disk drive (HDD)) 211 constituted by, for example, a hard disk, is a readable and writable device that stores programs and data involved in each processing by the apparatus, and temporary data, user data that has been sent to the apparatus, and so forth.

An operation unit 212 receives an instruction input to the apparatus by a user or a service engineer. A display unit 213 displays an operating status of the apparatus and information about operations with respect to the operation unit 212. The display unit 213, which forms a touch panel, is designed to be able to receive instructions of a displayed menu and an input target area. A modem 214 is connected to the telephone line. A system bus 215 connects respective units 201 to 214 with each other to allow them to exchange data with each other.

FIG. 3 illustrates an example of a user interface displayed on the display unit 213 illustrated in FIG. 1. The example corresponds to a state of the display unit 213 when the MFP 101 enters the service mode. Menus 302 to 307, and 309 described below are displayed as buttons on the touch panel, and configured to allow the service engineer to select any of these menus. In the MFP 101, other than the service mode, there is available a mode called a normal mode for a general user to perform setting for copying and setting for sending FAX on the operation unit 212 and the display unit 213. Further, the service mode refers to a special mode that can be utilized by performing a specific operation with respect to the operation unit 212, so that the service engineer can perform a maintenance work and repair work.

In FIG. 3, a menu screen 301 corresponds to a state in which a menu for the maintenance/repair work to be displayed on the display unit 213 is displayed when the service mode is entered. A menu screen 308 corresponds to a state displayed on the display unit 213 during the service mode, for ending the service mode. In the menu screen 301 and the menu screen 308, the same reference numerals designate menu items that are not subjected to state changes on the both screens.

A menu 302 is a used to view a history of serious errors that occurred on the MFP 101. A menu 303 is used to view version information of each program that controls the MFP 101. A menu 304 is used to view various pieces of print counter information that indicate the number of sheets output by printing on the MFP 101 or the number of printed planes. A menu 305 is used to view a usage status of consumable parts that constitute the MFP 101, and to reset a counter when the parts have been replaced. A menu 306 is used to confirm and change setting of parameters when disturbance or color misregistration of an image occurs. A menu 307 is used to declare the start of a maintenance work or repair work by the service engineer who performs maintenance and inspection of the MFP 101, which is selected by the service engineer. When the service engineer instructs the menu 307, the menu 307 is changed to the menu 309 for ending the work by the service engineer.

Figure 4:
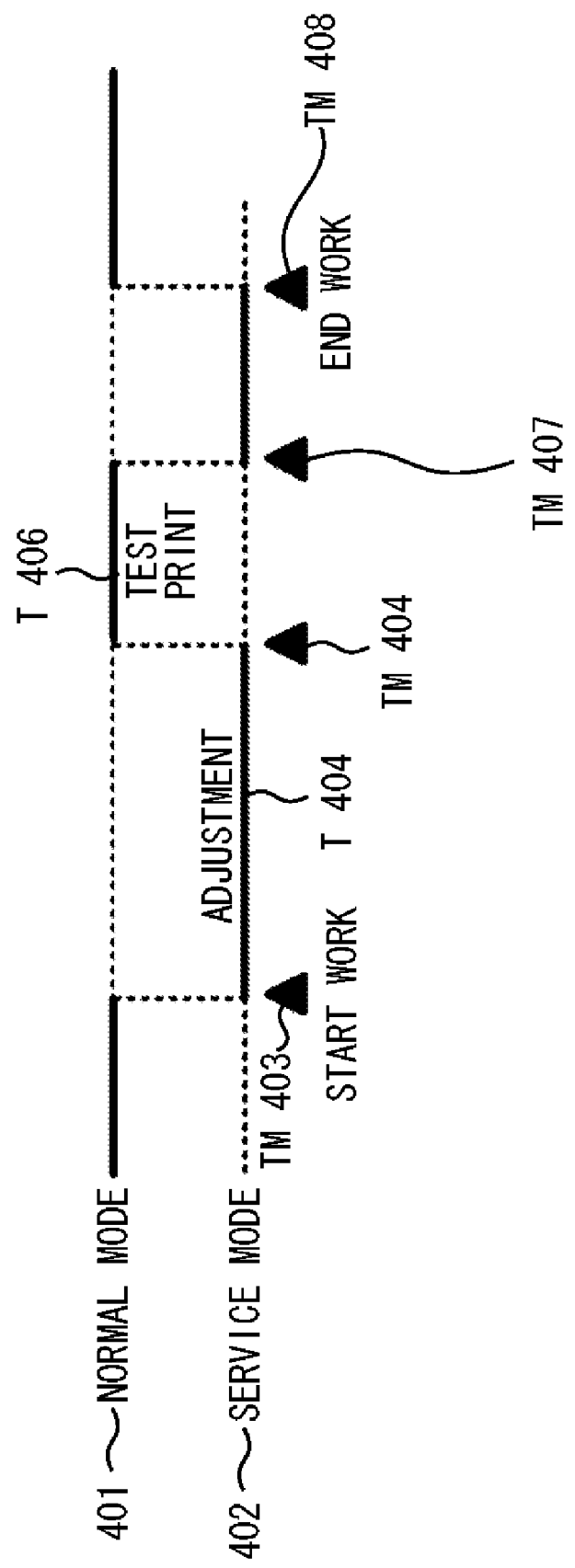
FIG. 4 is a timing chart illustrating a mode transition of the image forming apparatus.

FIG. 4 is a timing chart illustrating a transition of modes in the image forming apparatus according to the present exemplary embodiment. The example illustrates a transition of the MFP 101 from a normal mode, via a shift to a service mode by a service engineer, and to a return state from the service mode to the normal mode. FIG. 4 illustrates that the MFP 101 is in a state of a normal mode 401. In the normal mode 401, the MFP 101 receives print data from an external PC or the like in different timings, and is ready to execute a printing operation. Further, the MFP 101 is ready to execute a copying operation according to instruction by the operation unit 212.

On the other hand, FIG. 4 illustrates that the MFP 101 is in a state of a service mode 402 in which the service engineer performs a maintenance work or repair work of the MFP 101. An entry into the service mode 402 is achieved by the service engineer who performs a special operation on the operation unit 212. The service engineer, when performing the maintenance work or repair work, starts the work at a timing TM 403 by entering the service mode 402. The service engineer can manage accurate timing when the work is to be started, by pressing the menu 307 illustrated in FIG. 3. Then, during a time period T 404, the service engineer performs works such as a parts replacement and an image adjustment.

Next, the MFP 101 exits the service mode 402 at a timing TM 405, and returns to the normal mode 401. Then, the MFP 101 performs a test printing operation during a time period T 406 in the normal mode 401. After the test printing operation, the MFP 101 enters the service mode 402 once again at a timing TM 407, and performs confirmation of set parameters and recording of counters, and ends the work at a timing TM 408. Then, when the service mode 402 is exited, the service engineer returns the MFP 101 to the normal mode 401. The time period T 406 corresponds to an execution time period of a testing job to confirm an adjustment result after the service engineer has performed the adjustment of the image forming apparatus during the time period T 404.

FIG. 5 illustrates an example of authentication information retained by the MFP 101 illustrated in FIG. 1. In FIG. 5, an authentication information table 501 is managed while being retained by a hard disk drive (HDD) 211. If the authentication information table 501 exists, the CPU 208 of the MFP 101 determines that authentication is required for print execution. A state that requires the authentication is called an authentication mode in the present exemplary embodiment. The authentication information table 501 is composed of a password 503 for an account 502 and execution authority information 504 for each function, and can retain information of a plurality of accounts in list format.

Figure 6:
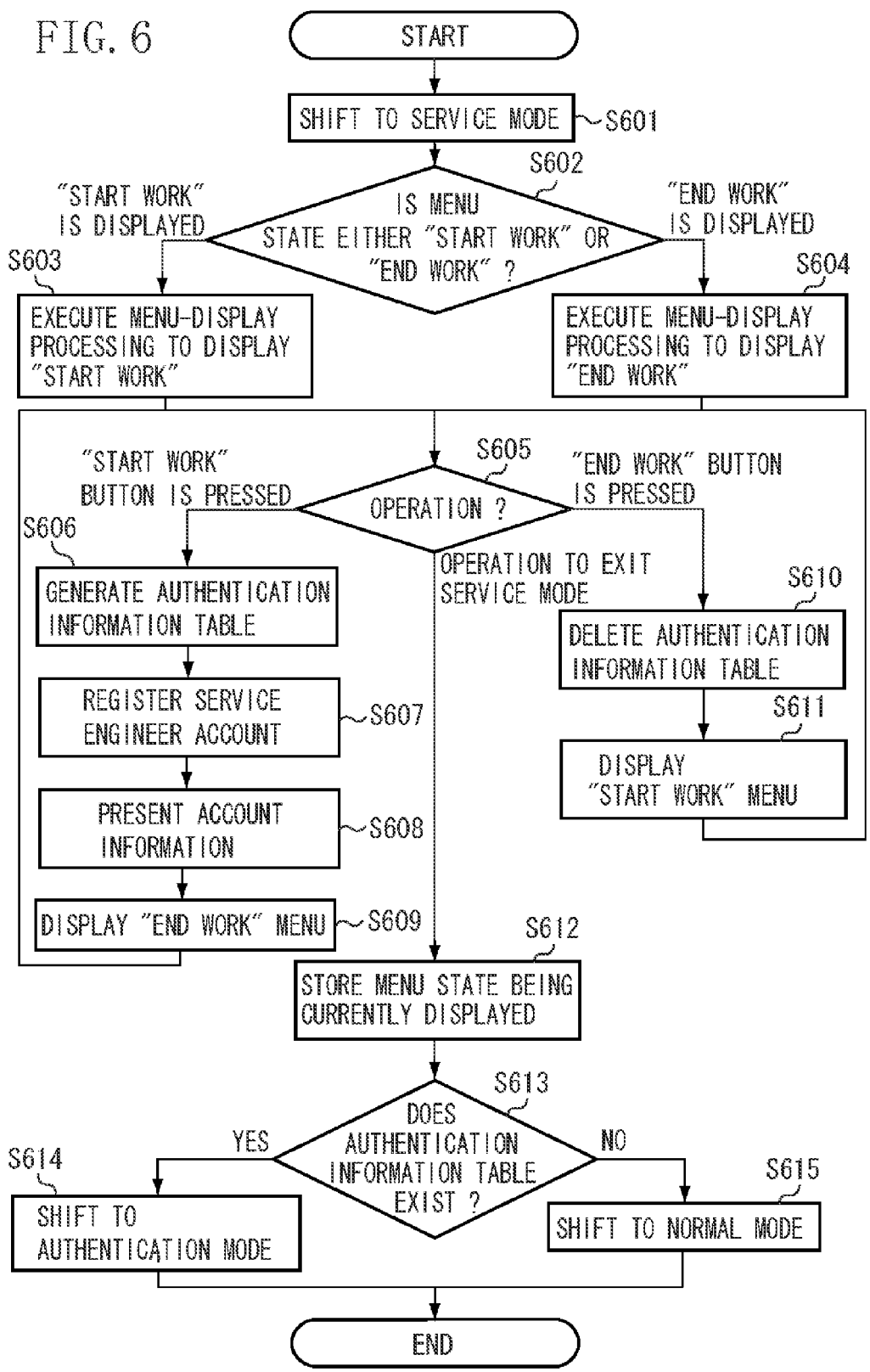
FIG. 6 is a flowchart illustrating data processing by the image forming apparatus.

FIG. 6 is a flowchart illustrating an example of data processing by the image forming apparatus according to the present exemplary embodiment. The example is a data processing example when the MFP 101 has entered the service mode. Each step is implemented by causing the CPU 208 illustrated in FIG. 2 to load and execute a control program into the RAM 210. The control program is stored in the ROM 209 and the HDD 211. In the present exemplary embodiment, the work related to maintenance and its completion are based on operations corresponding to the menus 307 or 309 illustrated in FIG. 3. The menu 307 corresponds to "start work", and the menu 309 corresponds to "end work".

In the operation unit 212 of the MFP 101, when an operation for entering the service mode is instructed by the service engineer, then in step S601, the CPU 208 shifts a mode state to the service mode. Next, in step S602, the CPU 208 determines, when exiting the service mode stored in the HDD 211, whether a menu state that the service engineer selected at the preceding time is either "start work" or "end work" (the menus 307/309) (as will be described below in step S612). If the CPU 208 determines that the display unit 213 displayed the menu 307 corresponding to the "start work" at the preceding time, then in step S603, the CPU 208 executes a menu-display processing to display the "start work" corresponding to the menu 307 on the display unit 213.

On the other hand, in step S602, if the CPU 208 determines that the menu 309 corresponding to the "end work" has been displayed, then in step S604, the CPU 208 executes the menu-display processing to display the menu 309 corresponding to the "end work" on the display unit 213. The states of the menu 307/menu 309 corresponding to the start/end work have their initial values. At the first time, in step S602, the CPU 208 determines that the menu 307 corresponding to the "start work" has been displayed at the preceding time.

Next, in step S605, the CPU 208 receives a selection of the menu displayed on the display unit 213 from the service engineer, and determines the received content. Operation contents associated with the present exemplary embodiment are in three types: the menu 307 corresponding to the "start work", the menu 309 corresponding to the "end work", and an operation to exit the service mode. Other operations are omitted in the flowchart.

In step S605, if the CPU 208 determines that the menu 307 corresponding to the "start work" is selected, the processing proceeds to step S606. Then, in step S606, the CPU 208 newly generates information as illustrated in the authentication information table 501 as information for executing authentication and retains it in the HDD 211. In the present exemplary embodiment, in step S606, the CPU 208 generates authentication information only for the service engineer, which is to be used for the authentication, when testing for the effect of the work or the like is executed.

Then, in step S607, the CPU 208 registers an account for the service engineer to the authentication information table. At this time, the CPU 208 also automatically generates a password of the generated account for the service engineer. Further, the CPU 208 sets an execution authority to an authority prepared in advance for the service engineer. Then, in step S608, the CPU 208 displays the generated account and password for the service engineer on the display unit 213, and presents it to the service engineer. The service engineer remembers or takes notes on the account information presented in step S608, and uses it when performing later test printing. Next, in step S609, the CPU 208 executes the menu-display processing to display the menu 309 corresponding to the "end work" in place of the menu 307 corresponding to the "start work". Then, the processing returns to step S605 to wait for the next operation.

On the other hand, in step S605, if the CPU 208 determines that the menu 309 corresponding to the "end work" is selected by the operation of the service engineer, the processing proceeds to step S610. Then, in step S610, the CPU 208 deletes the authentication information table 501 generated in the HDD 211 in step S606. Then, in step S611, the CPU 208 executes the menu-display processing to display the menu 307 corresponding to the "start work", in place of the menu 309 corresponding to the "end work". Then, the processing returns to step S605 to wait for the next operation.

Further, in step S605, if the CPU 208 determines that an operation to exit the service mode (operation to shift to the normal mode) is received, the processing proceeds to step S612. Then, in step S612, the CPU 208 stores in the RAM 210 the states corresponding to the start/end work (the menus 307/309) being currently displayed.

Then, in step S613, the CPU 208 determines whether the authentication information table exists within the HDD 211. If the CPU 208 determines that the authentication information table exists within the HDD 211, then in step S614, the CPU 208 exits the service mode, shifts the operations mode to the authentication mode, and ends the processing. On the other hand, in step S613, if the CPU 208 determines that the authentication information table does not exist within the HDD 211, then in step S615, the CPU 208 exits the service mode, shifts the operations mode to the normal mode, and ends the processing.

Figure 7:
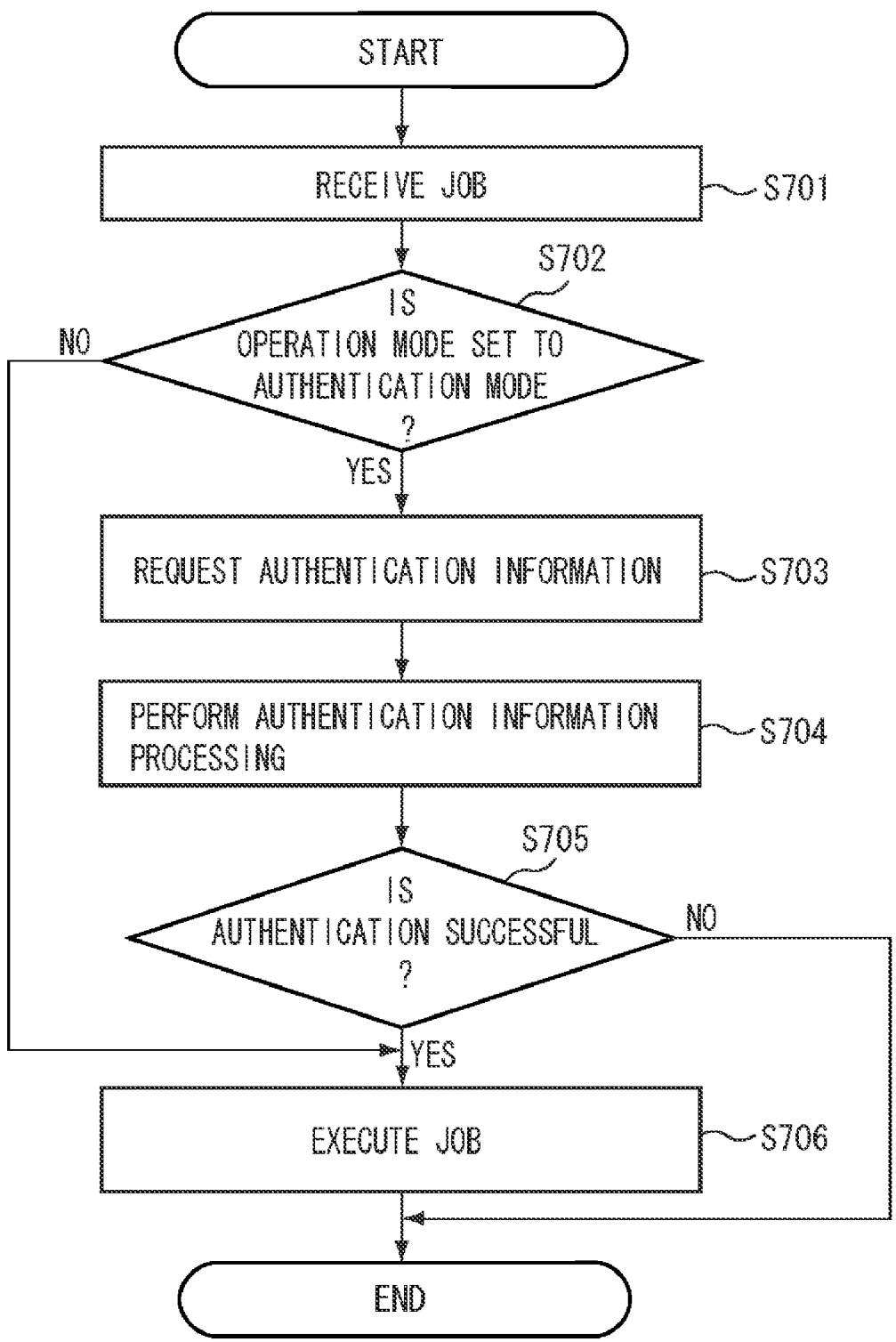
FIG. 7 is a flowchart illustrating data processing by the image forming apparatus.

FIG. 7 is a flowchart illustrating an example of data processing by the image forming apparatus according to the present exemplary embodiment. The example is a processing example in the normal mode and the authentication mode of the MFP 101. Each step is implemented by causing the CPU 208 illustrated in FIG. 2 to load and execute a control program into the RAM 210. The control program is stored in the ROM 209 and the HDD 211. In step S701, the CPU 208 receives a copying job via the operation unit 212 and the display unit 213 or a printing job via a network or the like.

Next, in step S702, the CPU 208 determines whether the operations mode of the MFP 101 itself is the authentication mode, based on whether the authentication information table exists within the HDD 211. If the CPU 208 determines that the authentication information table 501 does not exist, namely, the MFP 101 is in the normal mode, the processing proceeds to step S706. In step S706, the MFP 101 executes the received printing job and then ends the processing.

On the other hand, in step S702, if the CPU 208 determines that the authentication information table exists, namely, the MFP 101 is in the authentication mode, the processing proceeds to step S703. In step S703, the CPU 208 makes a request of a sending source of the job for authentication information. In this request for authentication information, it is also possible to ask for inputting of the account and password being the authentication information in an interactive manner, in cooperation with a driver on the PC 102 to PC 104. Further, it is also possible to display a screen that requires a user to input the account and the password being the authentication information on the display unit 213, and to ask the user to input. Further, in the case of receiving a job via the telephone line 107 in which the interactive manner cannot be employed, it is also possible to assign the account and the password being the authentication information to the job in advance at the time of job generation by the driver. Next, in step S704, the CPU 208 performs authentication processing to collate a set of the account and the password being authentication information obtained in step S703 with the authentication information table.

Then, in step S705, the CPU 208 determines whether the authentication in step S704 is successful. If the CPU 208 determines that the authentication has been successful, the processing proceeds to step S706. Then, the CPU 208 executes the received job involving a printing operation, and ends the processing. On the other hand, in step S705, if the CPU 208 determines that the authentication has failed, the CPU 208 ends the processing without executing the received job involving a printing operation.

As a handling of jobs that do not involve a printing operation, in the present exemplary embodiment, the CPU 208 performs control to accumulate jobs in which the printing operations were not executed, for example, jobs received from the PC 102 to PC 104 as described above, in a print queue within the HDD 211. In an image forming apparatus that does not include a storage unit such as the HDD 211, it is also possible for the CPU 208 to simply discard jobs in which printing was not executed.

Further, it is also possible to employ a method to notify a request source via the driver, or to notify the display unit 213, of having accumulated jobs in a print queue or having discarded them, alternatively to notify nothing. Furthermore, if an electronic mail (e-mail) address of an originator is included in a job as originator information, it is also possible to notify the originator to that effect via the e-mail.

In the present exemplary embodiment, while the authentication information table is retained in the HUD 211 within the MFP 101, the authentication information may be retained on a server for authentication arranged on the network 108, or on a server for authentication arranged on the Internet 106. In this case, the MFP 101 retains access information to the server for authentication in advance, and performs processing to have access to the server for authentication, when generating the authentication information of steps S606 and S607, or when erasing the authentication information in step S610. Furthermore, when it is determined whether the authentication information exists in step S613, the MFP 101 also performs processing to have access to the server for authentication. Further, also in authentication information processes for determining print execution in steps S702 to S704, the MFP 101 performs processing to have access to the server for authentication.

Figure 8:
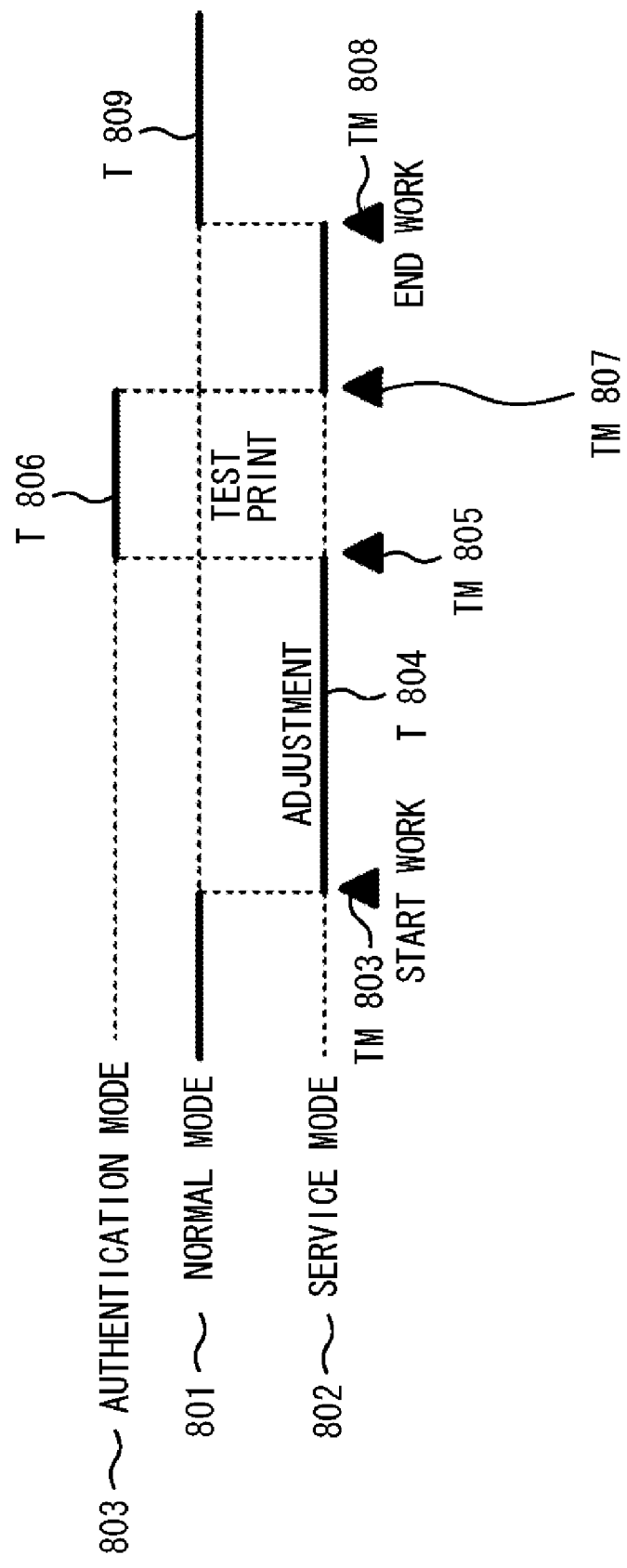
FIG. 8 is a timing flowchart illustrating a mode transition of the image forming apparatus.

FIG. 8 is a timing chart illustrating a transition of modes in the image forming apparatus according to the present exemplary embodiment. The example illustrates a transition of the MFP 101 from the normal mode, via a shift to the service mode by the service engineer, a shift to the authentication mode from the service mode, a shift to the service mode from the authentication mode, to a return state to the normal mode from the service mode.

In the present exemplary embodiment, the MFP 101 effects a transition between states of the operation modes as described below, according to the processes of the flowcharts illustrated in FIG. 6 and FIG. 7. In FIG. 8, a normal mode 801 is a state where the MFP 101 operates in the normal mode. A service mode 802 is a state where the MFP 101 operates in the service mode. The work of the service engineer includes a case of only viewing print counters and viewing parts information, and a case of requiring test printing after the works such as the parts replacement, the image adjustment, or updating of the control program.

When performing a work that requires the test printing, the service engineer selects the menu 307 corresponding to the "start work" at a timing TM 803. According to this selection, the CPU 208 executes the processes in steps S606 to 5609 in FIG. 6, thereby generating the authentication information table 501 containing account information exclusively for the service engineer on the RAM. 210 or on the HDD 211. The service engineer performs the adjustment work of the MFP 101 during a time period T804. Then, the service engineer performs an operation to exit the service mode 802 for performing the test printing for checking a state after the adjustment.

At this time, since the authentication information table 501 exists, for example, in the HDD 211 by the above-described processing, the CPU 208 executes the processes in steps S613 and 5614 in FIG. 6. Then, the CPU 208 causes the operations mode of the MFP 101 to shift to the authentication mode 803 in lieu of the normal mode 801 at a timing TM 805. In the authentication mode 803, only an account exclusively for the service engineer exists within the authentication information table 501. Therefore, a processable job during a testing time period T 806 in the timing chart illustrated in FIG. 8 is only a job by the service engineer whose authentication is successful.

When the test printing operation based on a job issued by the service engineer ends, the service engineer enters again the service mode 802 at a timing TM 807. In the service mode 802, the service engineer selects the menu 309 corresponding to the "end work", thereby ending the work at a timing TM 808. In addition, the CPU 208 of the MFP 101 deletes the authentication information table 501 from the HDD 211 by executing the processes in steps S610 and S611 in FIG. 6, and shifts the operation mode to the normal mode 801 at a timing TM 809. As a result, while the operation mode falls within the time period TM 809 of the normal mode 801, all printing jobs return to an executable state without the need to execute the authentication processing.

According to the present exemplary embodiment, when the CPU 208 receives an instruction to exit the service mode 802 by the service engineer, the CPU 208 temporarily shifts the operation mode to the authentication mode 803, if the authentication information table 501 exists, for example, in the HDD 211. For this reason, jobs from general users can be prevented from being immediately executed after returning to the normal mode 801 from the service mode 802.

The present invention can be applied to a case of executing the authentication processing on a job received when the image forming apparatus operates in the normal mode. A second exemplary embodiment of the present invention will be described in detail below. The second exemplary embodiment differs in configuration from the first exemplary embodiment, such that the MFP 101 requires an authentication for a job execution of a general user, and that a menu for selecting the start/end work does not exist in the service mode.

Figure 9:
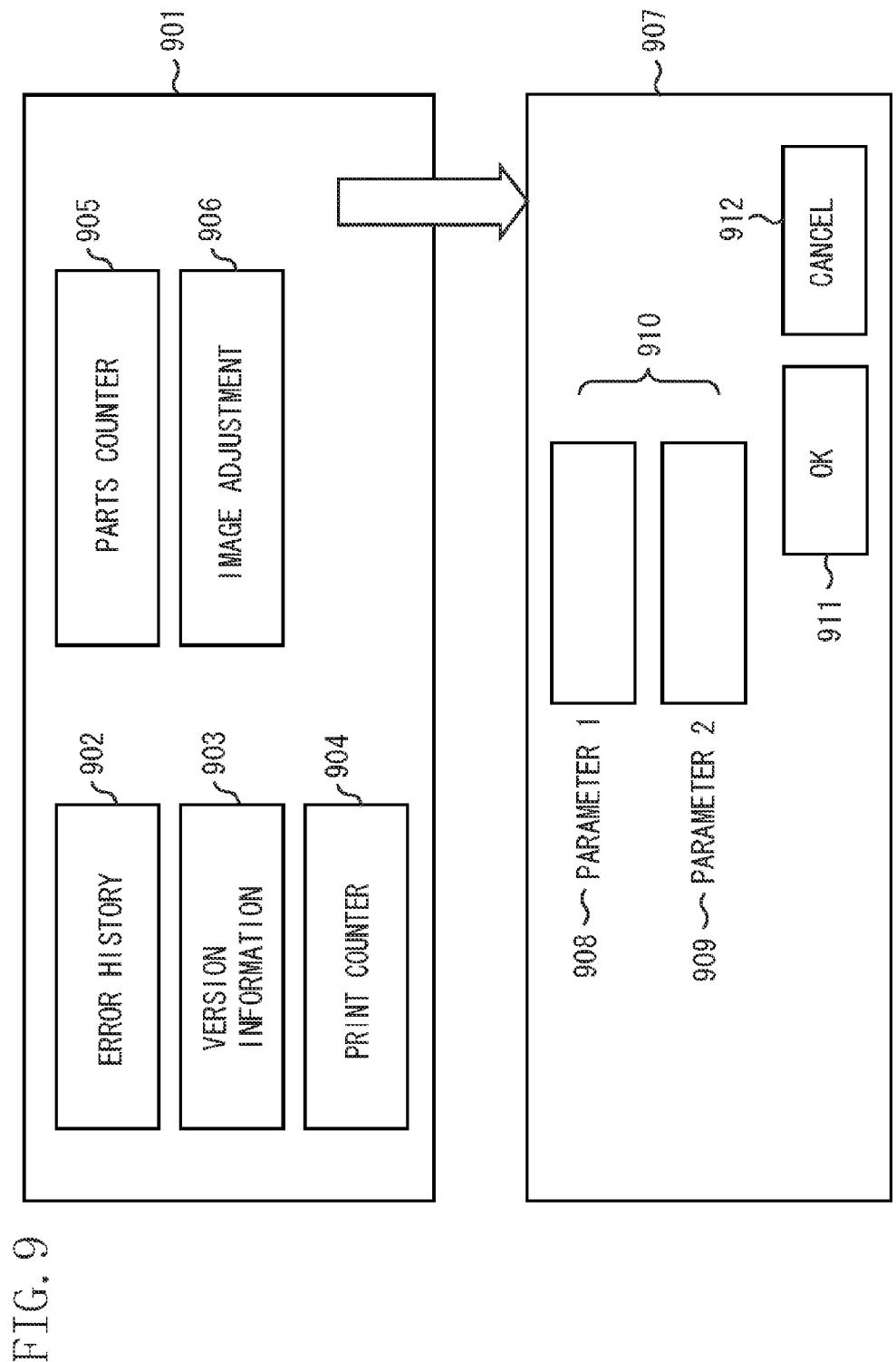
FIG. 9 illustrates a user interface (UI) to be displayed on the image forming apparatus.

FIG. 9 illustrates an example of a user interface displayed in the image forming apparatus according to the second exemplary embodiment. The example corresponds to a menu screen to be displayed on the display unit 213, when the MFP 101 enters the service mode according to an operation of the service engineer. FIG. 9 illustrates a state in which the menus 902 to 906 for the maintenance and repair works to be displayed on the display unit 213, when entering the service mode, are displayed on a menu screen 901. The menus 902 to 906 are subjected to the processes similar to those in the menus 302 to 306 in FIG. 3. Detailed description thereof will not be repeated here.

The menu 906 is a menu for the image adjustments such as confirming or changing the settings of parameters when disturbance or color misregistration of an image occurs. According to an instruction via the menu 906, a content of the display screen is switched to a parameter setting screen 907. In the parameter setting screen 907, items (parameters) 908, 909 for setting the parameters for the image adjustments exist, and input areas 910 for respective values are provided therein.

The service engineer inputs values into the displayed input areas 910 by manipulating a numeric keypad or the like using the operation unit 212 and the display unit 213. An "OK" button 911 can be pressed when information input into the input areas 910 is stored in the MFP 101. A "Cancel" button 912 can be pressed when the settings on the parameter setting screen 907 are disabled and the display screen returns to the screen 901.

Figure 10:
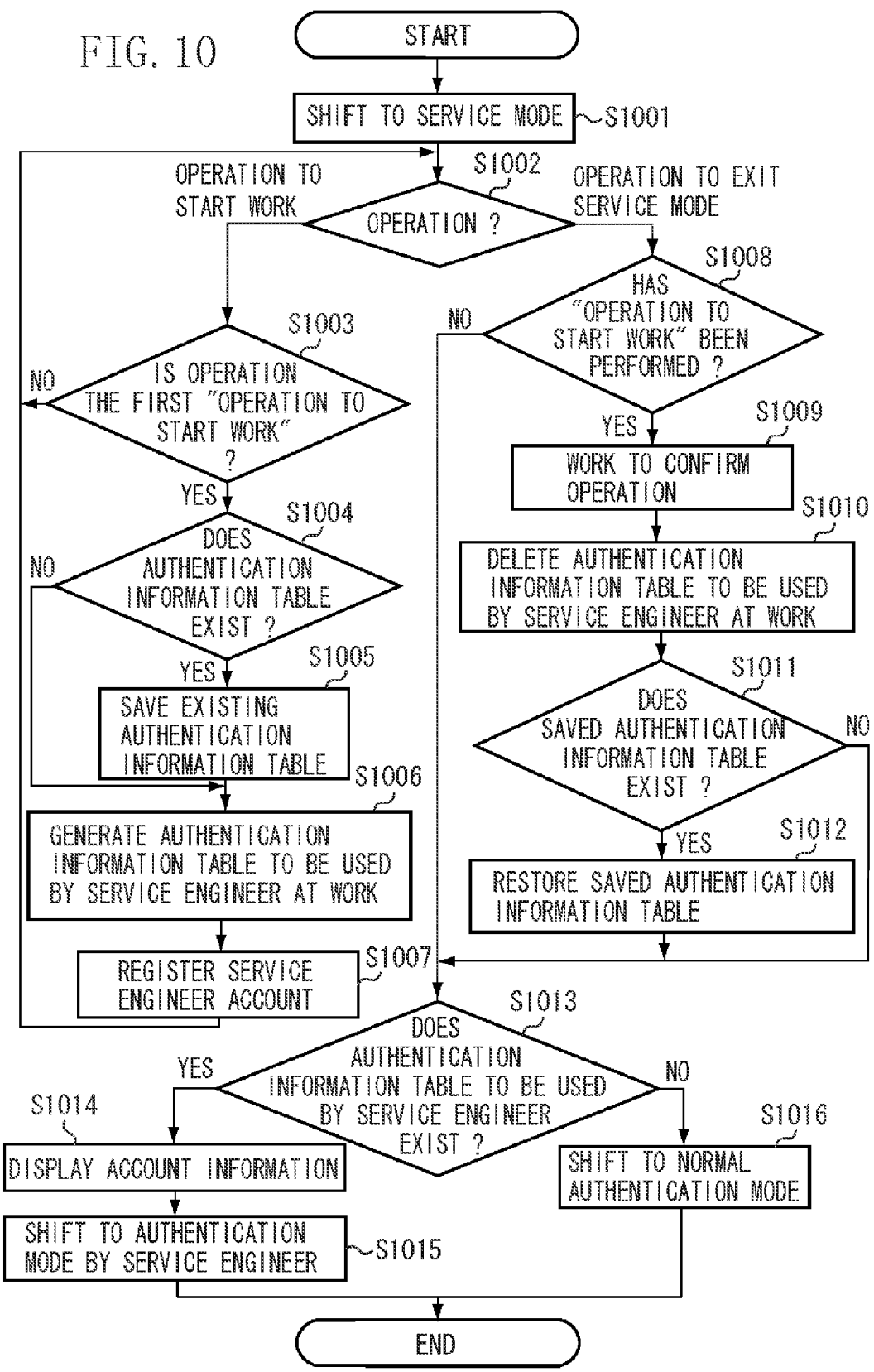
FIG. 10 is a flowchart illustrating data processing by the image forming apparatus.

FIG. 10 is a flowchart illustrating an example of data processing by the image forming apparatus according to the second exemplary embodiment. The example is a processing example in the service mode of the MFP 101. Each step is implemented by causing the CPU 208 illustrated FIG. 2 to load and execute a control program into the RAM 210. The control program is stored in the ROM 209 and the HDD 211. In the operation unit 212 of the MFP 101, when an operation for entering into the service mode is performed by the service engineer, then in step S1001, the CPU 208 shifts a mode state to the service mode.

Next, in step S1002, in the display unit 213, the CPU 208 receives a menu operation from the service engineer, and determines whether a content of the menu operation is a start work instruction or an exit service mode instruction. Operations according to the present exemplary embodiment are available in two types of "operation to start work" and operation to exit the service mode. Other operations will be omitted in the flowchart.

"Operation to start work", herein used, refers to an operation in which the "OK" button 911 is selected on a screen involved in a setting change as illustrated in the parameter setting screen 907 illustrated in FIG. 9. As processes that are deemed as the "operation to start work", various ones are assumed, and such works can be implemented by designing to display menus other than the image adjustments on the display unit 213, and the present invention can be applied in a similar manner.

On the other hand, operations that do not change settings such as the menu 902 that refers to an error history of the screen 901, the menu 904 that refers to a print counter, are not deemed as the "operation to start work". If the CPU 208 determines that "operation to start work" has been performed in step S1002, the processing proceeds to step S1003.

Then, in step S1003, the CPU 208 determines whether the operation is the first "operation to start work" in the service mode this time. If the CPU 208 determines that the operation is not the "operation to start work" at the first time in the service mode this time, the processing returns to step S1002 after performing processing involved in the operation, and waits for the next operation. On the other hand, in step S1003, if the CPU 208 determines that the operation is the "operation to start work" at the first time, the processing proceeds to step S1004. In the present exemplary embodiment, in the normal mode, an existing authentication information table (for general user) may exist in the HDD 211 for executing the authentication processing on a job.

Thus, in step S1004, the CPU 208 determines whether the existing authentication information table exists in the HDD 211. If the CPU 208 determines that the existing authentication information table exists, then in step S1005, the CPU 208 saves the existing authentication information table to the HDD 211. The CPU 208 causes the saved existing authentication information table to be restored to the HDD 211 in step S1011 described below, when the operations mode returns from the service mode to the normal mode. Accordingly, after the operations mode has returned from the service mode to the normal mode, a job processing based on the existing authentication information table can be properly performed. On the other hand, in step S1004, if the CPU 208 determines that the authentication information table does not exist, the processing proceeds to step S1006.

Then, in step S1006, the CPU 208 newly generates an authentication information table to be exclusively used by the service engineer at a testing work, and retains it on the HDD 211. Next, in step S1007, the CPU 208 registers an account for the service engineer in the authentication information table to be exclusively used by the service engineer on the HDD 211. At this time, the CPU 208 automatically generates a password of the generated account for the service engineer too. Further, the CPU 208 sets an execution authority to an authority prepared in advance for the service engineer. Then, the processing returns to step S1002 and waits for the next operation within the service mode.

On the other hand, in step S1002, if the CPU 208 determines that an operation to exit the service mode (operation to shift to the normal mode) is selected by the service engineer, then the processing proceeds to step S1008. In step S1008, the CPU 208 determines whether the "operation to start work" has been performed during the service mode this time. If the CPU 208 determines that the "operation to start work" has not been performed this time during the service mode, the processing proceeds to step S1009.

Then, in step S1009, the CPU 208 confirms parameters set in the service mode, receives an operation for the service engineer to record counters, and displays necessary information. In the present exemplary embodiment, when exiting the service mode without performing the operation, it is performed at this timing as a confirmation processing to be performed after the test printing or the like.

In step S1010, the CPU 208 deletes the authentication information table to be exclusively used by the service engineer from the HDD 211. The authentication information table was generated by CPU 208 in step S1006. Next, in step S1011, the CPU 208 determines whether the authentication information table saved in step S1005 exists in the HDD 211.

In step S1011, if the CPU 208 determines that the saved authentication information table exists in the HDD 211, then in step S1012, the CPU 208 restores the saved authentication information table. Then, the processing proceeds to step S1013. On the other hand, in step S1011, if the CPU 208 determines that the saved authentication information table does not exist on the HDD 211, the processing proceeds to step S1013.

Then, in step S1013, the CPU 208 determines whether the authentication information table to be exclusively used by the service engineer exists. If the CPU 208 determines that the authentication information table to be exclusively used by the service engineer exists, the processing proceeds to step S1014. The processing here is to be a transition for the test printing after works such as some adjustments have been performed in the service mode.

Then, in step S1014, the CPU 208 displays the account and password for the service engineer generated in step S1007 on the display unit 213, and indicates them to the service engineer. The service engineer remembers or takes notes on account information presented in step S1014, and uses them when the test printing is performed. Then, in step S1015, the CPU 208 exits the service mode, shifts to authentication mode for receiving authentication information of the service engineer, and ends the processing.

On the other hand, in step S1013, if the CPU 208 determines that the authentication information table to be exclusively used by the service engineer does not exist, then in step S1016, the CPU 208 exits the service mode. Then, the CPU 208 shifts to a normal authentication mode in which the authentication information table for the general user is used, and ends the processing. Here, the normal authentication mode that uses the authentication information table is a mode for authenticating a user of a job received from the PCs 102 to 104 or the operation unit 212 and determining whether the job is to be executed.

It is configured such that processing programs illustrated in the first and second exemplary embodiments be stored in advance in a storage area such as the ROM 209 of the MFP 101, or additionally installed on the HDD 211. Further, if the image forming apparatus has an interface that captures data from external storage devices, it may be configured such that the processing programs illustrated in the first and second exemplary embodiments be captured from a storage medium to the image forming apparatus.

According to the above-described exemplary embodiments, when the CPU 208 generates the authentication information table to be exclusively used by the service engineer, and exits the service mode, the CPU 208 shifts the MFP 101 to the authentication mode. In the authentication mode, only the account of the service engineer is valid as described above. For this reason, it has become possible for the service engineer to perform the test printing in priority to a printing job that the general user is likely to execute at an arbitrary timing. As a result, since the job of the general user will never interrupt before the test printing, it has become possible for the service engineer to smoothly perform a maintenance or repairing work.

Furthermore, it has become possible for the general user to avoid an event that an intended output result will not be obtained, resulting from that the MFP 101 performs a printing operation under an unstable condition before the service engineer performs a setting change and performs a confirmation work by the test printing. Further, when the service engineer performs a parts replacement work, it is necessary to turn off power during the service mode. When power is turned on again, the MFP 101 starts up in the normal mode as a default operation. In this case also, the MFP 101 is in a state in which only a job of the service engineer can be received via the authentication, according to steps S606 and 5607 illustrated in FIG. 6, namely the authentication mode 802 prevails. Hence, against a suspension of the work due to a power off during the service mode, the service engineer can continue the work without being interrupted by a job of the general user when turning on power.

In the above-described exemplary embodiments, while a case in which the image forming apparatus executes the authentication processing by the service engineer has been described, it may be configured such that a management server connected to the network executes the user authentication and service engineer authentication. In this case, the management server sends generated authentication information to the image forming apparatus via a job ticket. More specifically, by selecting a menu for starting a work to be performed by the service engineer, the image forming apparatus is switched to the authentication mode in which the authentication is carried out by the management server. Then, the management server transfers information for the authentication (a job ticket or the like) to the image forming apparatus (for local test printing) and a terminal (for remote test printing) of the service engineer recognized by the management server.

Next, when the service engineer executes a job using the authentication information, the management server performs an authentication operation. Then, when the service engineer selects an end work in the above-described menu, the management server executes processing to cancel the authentication mode of the image forming apparatus.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-025815 filed Feb. 6, 2009, which is hereby incorporated by reference herein in its entirety.

What is claimed is:

1. An image forming apparatus configured to be operable in a service mode for performing a work related to maintenance and a normal mode for processing an input job, the image forming apparatus comprising at least a processor, functioning as:
   a receiving unit configured to receive an operation to shift to the service mode and an operation to exit the service mode;
   an input unit configured to input an instruction for the work related to maintenance in the shifted service mode in response to the receiving unit receiving the operation to shift to the service mode; and
   a generation unit configured to generate authentication information to be used for confirmation processing of the work related to maintenance,
   wherein when the image forming apparatus exits the service mode in response to the receiving unit receiving the operation to exit the service mode before the work related maintenance ends, processing of the job is performed if authentication based on the authentication information generated by the generation unit is successful, and
   wherein when the receiving unit receives the operation to exit the service mode after the work related to maintenance ends, the image forming apparatus shifts to the normal mode.

2. The image forming apparatus according to claim 1, wherein a start and completion of the work related to maintenance is determined based on an input of start work and end work in the service mode by the input unit.

3. The image forming apparatus according to claim 1, further comprising a deletion unit configured to delete the authentication information generated by the generation unit when the receiving unit receives the operation to exit the service mode after the work related to maintenance ends.

4. The image forming apparatus according to claim 1, further comprising a display unit configured to display the authentication information generated by the generation unit when the image forming apparatus exits the service mode in response to the receiving unit receiving the operation to exit the service mode before the work related to maintenance ends.

5. A method for an image forming apparatus configured to be operable in a service mode for performing a work related to maintenance and a normal mode for processing an input job, the method comprising:
   receiving an operation to shift to the service mode and an operation to exit the service mode;
   inputting an instruction for the work related to maintenance in the shifted service mode in response to receiving the operation to shift to the service mode;
   generating authentication information for confirmation processing of the work related to maintenance;
   when the image forming apparatus exits the service mode in response to receiving the operation to exit the service mode before the work related to maintenance ends, performing processing of the job if authentication based on the generated authentication information is successful; and
   shifting to the normal mode when receiving the operation to exit the service mode after the work related to maintenance ends.

6. A computer-readable storage medium storing a computer program for causing a computer to perform a method, the method comprising:
   receiving an operation to shift to a service mode from a normal mode and an operation to exit the service mode, wherein the service mode is a mode for performing a work related to maintenance and the normal mode is a mode for processing an input job;
   inputting an instruction for the work related to maintenance in the shifted service mode in response to receiving the operation to shift to the service mode;
   generating authentication information to be used for confirmation processing of the work related to maintenance;
   when exiting the service mode in response to receiving the operation to exit the service mode before the work related to maintenance ends, performing processing of the job if authentication based on the generated authentication information is successful; and
   shifting to the normal mode when receiving the operation to exit the service mode after the work related to maintenance ends.

* * * * *